United States Patent
Lany et al.

(10) Patent No.: US 12,209,858 B2
(45) Date of Patent: Jan. 28, 2025

(54) ROTATABLE INSPECTION DEVICE FOR DEFECT DETECTION

(71) Applicant: Sensima Inspection Sàrl, Gland (CH)

(72) Inventors: Marc Lany, Rolle (CH); Alain Berthoud, Châtelaine (CH); Julien Hubleur, Geneva (CH); Bernard Revaz, Geneva (CH); Gilles Santi, Lausanne (CH); Frédéric Monnier, Cortaillod (CH)

(73) Assignee: Sensima Inspection Sàrl, Gland (CH)

( * ) Notice: Subject to any disclaimer, the term of this patent is extended or adjusted under 35 U.S.C. 154(b) by 365 days.

(21) Appl. No.: 17/613,679

(22) PCT Filed: May 20, 2020

(86) PCT No.: PCT/IB2020/054760
§ 371 (c)(1),
(2) Date: Nov. 23, 2021

(87) PCT Pub. No.: WO2020/234786
PCT Pub. Date: Nov. 26, 2020

(65) Prior Publication Data
US 2022/0228849 A1  Jul. 21, 2022

(30) Foreign Application Priority Data
May 23, 2019  (CH) ..................... 00666/19

(51) Int. Cl.
*G01B 7/30*  (2006.01)
*G01B 11/30*  (2006.01)
(Continued)

(52) U.S. Cl.
CPC ............... *G01B 7/30* (2013.01); *G01B 11/30* (2013.01); *G01D 5/145* (2013.01); *G01D 21/00* (2013.01)

(58) Field of Classification Search
CPC ...... G01B 7/30; G01B 11/30; G01B 2210/58; G01D 5/145; G01D 21/00; G01M 5/0075;
(Continued)

(56) References Cited

U.S. PATENT DOCUMENTS 1,950,912 A    3/1934  Aronson
2,188,754 A *  1/1940  Keeler ................. B65H 63/028
                                                       346/33 F
(Continued)

FOREIGN PATENT DOCUMENTS

CN     107923564 A  *  4/2018  .............. B25J 19/02
KR     20170117678     *  10/2017
KR     1020170117678 A    10/2017

OTHER PUBLICATIONS

International Search Report & Written Opinion for PCT/IB2020/054760, dated Oct. 1, 2020, 10 pages.

*Primary Examiner* — Octavia Hollington
(74) *Attorney, Agent, or Firm* — BLANK ROME LLP

(57) ABSTRACT

The invention relates to a rotatable inspection device (10) for inspection of the integrity of an axisymmetric portion (210) of parts (200), for example a threaded tube (200). The rotatable inspection device (10) includes a measuring unit (20) configured to be rotated about the symmetry axis of the axisymmetric portion (210). The measuring unit (20) comprises: i) a radially movable measuring structure (22) comprising a defect detection sensor (30), wherein said measuring structure (22) is configured to urge the defect detection sensor (30) against said portion (210) to be inspected; ii) an electronic device (43) for processing and transmitting the signal measured by the defect detection sensor (30) along said portion (210), and iii) a measuring unit support (50) supporting the radially movable measuring structure (22).

(Continued)

The electronic device (43) is configured to wirelessly transmit the processed signal to a remote monitoring unit (300).

29 Claims, 7 Drawing Sheets

(51) Int. Cl.
 *G01D 5/14* (2006.01)
 *G01D 21/00* (2006.01)

(58) Field of Classification Search
 CPC ... G01M 5/0025; G01M 5/0083; G01M 13/00
 See application file for complete search history.

(56) References Cited

U.S. PATENT DOCUMENTS

| | | | |
|---|---|---|---|
| 2,849,804 A | 9/1958 | Johnson | |
| 6,047,479 A | 4/2000 | Galestien | |
| 6,145,207 A | 11/2000 | Brunson | |
| 6,318,164 B1 | 11/2001 | Atalla | |
| 8,164,758 B2* | 4/2012 | Johnson | G01B 11/2425 356/399 |
| 8,410,466 B2* | 4/2013 | Johnson | G01B 11/2425 356/613 |
| 10,119,810 B2* | 11/2018 | Stigall | G01B 11/12 |
| 11,035,657 B2* | 6/2021 | Hara | G01B 3/48 |
| 2010/0110448 A1 | 5/2010 | Johnson | |
| 2015/0022823 A1* | 1/2015 | Bonadeo | G01B 11/2425 356/601 |
| 2015/0362305 A1* | 12/2015 | Ferrari | G01D 5/34 33/503 |

* cited by examiner

A-A

ROTATABLE INSPECTION DEVICE FOR DEFECT DETECTION

RELATED APPLICATIONS

This application is a national phase of PCT/IB2020/054760, filed on May 20, 2020, which claims the benefit of Swiss Application No. 00666/19, filed on May 23, 2019. The entire contents of those applications are hereby incorporated by reference.

FIELD OF THE INVENTION

The present invention relates to an inspection device for defect detection during inspection of threads of axisymmetric portions of parts such as tubes, pipes, bolts, bolt holes or threaded joints. In an application of particular interest, the invention relates to an inspection device for inspecting the integrity of a conical threaded portion of a cylindrical part, notably a drilling pipe of a drill string. The inspection device may also be used to inspect non-threaded portions of drilling pipes, such as stress relief grooves and welds. The present invention also relates to a defect inspection device comprising a remote monitoring unit configured to be in wireless communication with the rotatable inspection device.

DESCRIPTION OF RELATED ART

Drill pipes are subject to significant stresses that lead to fatigue cracks in the threads. Poor handling and use can also result in other types of defects such as galling of the threads or other area such as seals, and alteration to the tread geometry (pulled threads, over-torqued threads). Defects of threaded portions are also worsened by washout, which also causes specific alterations of the tread.

Breakage of the drill pipe inside the wells generates large financial losses, not to mention the environmental consequences caused by a change in drilling location. To avoid this problem, non-destructive testing (NDT) methods such as visual inspection, magnetoscopy or die penetrant inspection are used to ensure that faulty pipes are removed from service before the defects exceed a specified threshold size.

The drill pipes are screwed together by a conical thread. In the majority of cases, the rupture is in one of the two threaded portions. Other critical regions are stress relief zones, grooves and welds.

Magnetoscopy inspection involves creating an intense magnetic flux inside a ferromagnetic material. When a defect is present in its path, the magnetic flux is deflected and creates a leak which, by attracting colored or fluorescent magnetic particles, provides a particular signature of the defect.

Die penetrant inspection uses the capillary properties of materials to reveal defects of non-porous materials.

These inspection methods have the disadvantage of requiring thorough cleaning of the tubes as well as rigorous preparation of the surfaces inside the threads. The preparation and inspection time of the tubes are therefore relatively long and thus represent a significant cost.

An aim of the present invention is therefore to provide a rotatable inspection device for rapid inspection of axisymmetric portions of parts in general and in particular for the inspection of threaded portions of drill pipes.

Another aim of the present invention is to provide a rotatable inspection device which accurately detects defects in threaded portions of tubes in general and in particular in treaded portions of drill pipes.

Another aim of the present invention is to provide a rotatable inspection device for handheld inspection, that can be used both at a pipe storage location and on the rig.

Another aim of the present invention is to provide a rotatable inspection device which may adapt to different sizes and types of threaded portion of tubes.

Another aim of the present invention is to provide a rotatable inspection device connected to a hand-held drive unit for rapid and repeatable inspection.

A further aim of the present invention is to provide a defect inspection device comprising a remote monitoring unit in wireless communication with an electronic device of the rotatable inspection device.

BRIEF SUMMARY OF THE INVENTION

These aims are achieved, according to an aspect of the invention, by a rotatable inspection device for inspection of the integrity of an axisymmetric portion of parts, for example a threaded tube. The inspection device includes a measuring unit configured to be rotated about the symmetry axis of the axisymmetric portion. The measuring unit comprises:
- a radially movable measuring structure comprising a defect detection sensor, said measuring structure being configured to urge the defect detection sensor against said portion to be inspected,
- an electronic device for processing and transmitting the signal measured by the defect detection sensor along said portion, and
- a measuring unit support supporting the radially movable measuring structure.

The electronic device is configured to wirelessly transmit the processed signal to a remote monitoring unit.

In an embodiment, the radially movable structure comprises at least one biased arm. The defect detection sensor is mounted at a distal end of the at least one biased arm.

In an embodiment, the axisymmetric portion is a threaded or non-threaded portion of a tube. The at least one biased arm is configured to urge the defect detection sensor against the threaded portion or non-threaded portion to be inspected.

In an embodiment, the electronic device comprises a battery, a transmitter and a signal processing unit including an A/D converter for converting the analog signal measured by the defect detection sensor into a digital signal to be sent to the remote monitoring unit.

In an embodiment, the radially movable measuring structure comprises a first, a second and a third biased arm. The defect detection sensor is mounted at a distal end of the first biased arm while a first and a second guiding elements are mounted at a distal end of the second and third biased arms respectively.

In an embodiment, the first, second and third biased arms are arranged at 120 degrees from each other with respect to the rotation axis of the measuring unit support.

In an embodiment, a proximal end of each of the first, second and third biased arms is pivotally mounted on a supporting base which is connected or forms an integral part with the measuring unit support.

In an embodiment, each of the first, second and third biased arms is biased by an elastic member, preferably in the form of a flexion spring.

In an embodiment, the rotatable inspection device is configured to inspect the integrity of a helical thread of a threaded portion located on an inner surface of a threaded tube. The elastic member is arranged to urge the distal ends of the first, second and third biased arms outwardly against the threaded portion.

In an embodiment, the rotatable inspection device is configured to inspect the integrity of a helical thread of a threaded portion located on an outer surface of a threaded tube. The elastic member is arranged to urge the distal ends of the first, second and third biased arms inwardly against the threaded portion.

In an embodiment, each of the first, second and third biased arms is kinematically linked to a manually operable part. The manually operable part is slidably mounted on a manually operable sliding portion of the measuring unit support.

In an embodiment, the first, second and third biased arms are pivotally actuated by the sliding movement of the manually operable part along said sliding portion to move together their respective distal end inwardly in a direction towards the rotation axis of the measuring unit support or outwardly in a direction opposite the direction towards said rotation axis.

In an embodiment, the sensor(s) and guiding element(s) are offset from each other with respect to the rotation axis of the measuring unit support by P/N, where P is the pitch of a helical thread of a threaded portion to be inspected and N the total number of guiding elements and sensing elements.

In an embodiment, the rotatable inspection device further comprises a measuring unit driving shaft to rotate the measuring unit about the axis of rotation of the rotatable inspection device. The measuring unit support comprises an axial passage receiving a linear-motion bearing through which the measuring unit driving shaft passes.

In an embodiment, the rotatable inspection device further comprises a drive unit connected to the measuring unit driving shaft.

In an embodiment, the rotatable inspection device further comprises an anchoring unit configured to secure the measuring unit to the threaded or non-threaded part to ensure rotation of the measuring unit coaxially with the axis of the thread or with the axis of the axisymmetric portion during an inspection of said portion.

In an embodiment, the anchoring unit comprises an anchoring actuator and an anchoring device configured to be fitted into a receiving section of the threaded or non-threaded part. The anchoring device comprises at least one an extendable member configured to secure a static part of the anchoring device to the receiving section, and a rotatable part comprising an axial passage along which a distal portion of the measuring unit driving shaft is fixedly fitted.

In an embodiment, the anchoring actuator comprises a rod extending through an axial passage of the measuring unit driving shaft and a rod displacement actuator configured to move the rod into a first and a second axial position. The at least one extendable member is in a non-extended configuration in which the anchoring device may be fitted into the receiving section of the threaded or non-threaded part when said rod is in the first axial position, and wherein the at least one extendable member is brought into an extended configuration in which the anchoring device is bound to the receiving section through the at least one extendable member when said rod is moved from the first to the second axial position.

In an embodiment, the measuring unit comprises an angular sensor configured to measure the angle between the measuring unit and the drive unit.

In an embodiment, the measuring unit comprises a linear position or displacement sensor configured to measure the position between the linear-motion bearing and the measuring unit driving shaft.

In an embodiment, the measuring unit comprises an angular sensor configured to measure the angle between the measuring unit and the axisymmetric portion.

In an embodiment, the measuring unit comprises an angular sensor configured to measure the angle between the measuring unit and the direction of gravity.

Another aspect of the invention relates to a defect inspection device comprising the rotatable inspection device as described above and a remote monitoring unit configured to be in wireless communication with the electronic device of the rotatable inspection device. The remote monitoring unit comprises a display unit for displaying information relative to the integrity of the thread and/or of the axisymmetric portion of the part.

In an embodiment, said information is displayed on the remote monitoring unit in real-time when the rotatable inspection device is inspecting said axisymmetric portion.

In an embodiment, the remote monitoring unit is a portable device such as an electronic tablet or a Smartphone.

Another aspect of the invention relates to a method for inspection of the integrity of a helical thread located on an inner surface of a threaded tube. The method comprises the following steps:

a) inserting, at least partly, the radially movable measuring structure of the rotatable inspection device as described above into a threaded portion of the threaded tube such the defect detection sensor is fitted into the helical thread, b) rotating a measuring unit driving shaft passing through an axial passage of the measuring unit support to move the defect detection sensor along the helical thread, and c) wirelessly transmitting an inspection signal to a remote monitoring unit while the defect detection sensor is moving along the helical thread.

In an embodiment, the radially movable measuring structure comprises three pivotable arms comprising each biasing means to urge their respective distal end outwardly. The defect detection sensor is mounted at the distal end of one pivotable arm while a first and a second guiding elements are mounted at a distal end of the other two pivotable arms respectively. Step a) of the method consists of:

pivoting the pivotable arms together to move their distal end inwardly in direction of the central axis of the threaded tube in order to fit the distal ends into the threaded portion, and releasing the pivotable arms to move their respective distal end outwardly under the action of their respective biasing means in order to press the defect detection sensor and the first and second guiding elements against the helical thread.

In an embodiment, an anchoring device is fitted into a receiving section of the cylindrical part before step b).

In an embodiment, the angular and/or linear positions of the measuring unit are measured by an angular and/or a linear position sensor(s) during an inspection of the integrity of the helical thread. The angular and/or linear positions of the measuring unit is/are correlated to the data measured by the defect sensor data in these positions in order to create a map of the defects.

BRIEF DESCRIPTION OF THE DRAWINGS

The invention will be better understood with the aid of the description of several embodiments given by way of examples and illustrated by the figures, in which:

FIG. 1b shows a back-perspective view of FIG. 1a;

FIG. 2 shows a side view of FIG. 1a;

FIG. 7 shows a top view of the measuring unit support of the rotatable inspection device of FIG. 1a;

FIG. 9 shows a cross-sectional view of FIG. 8a along the line B-B when the tube anchoring unit is in an anchoring configuration;

FIG. 12b shows an elevation view of FIG. 12a, and

DETAILED DESCRIPTION OF SEVERAL EMBODIMENTS OF THE INVENTION

Figure 1A:
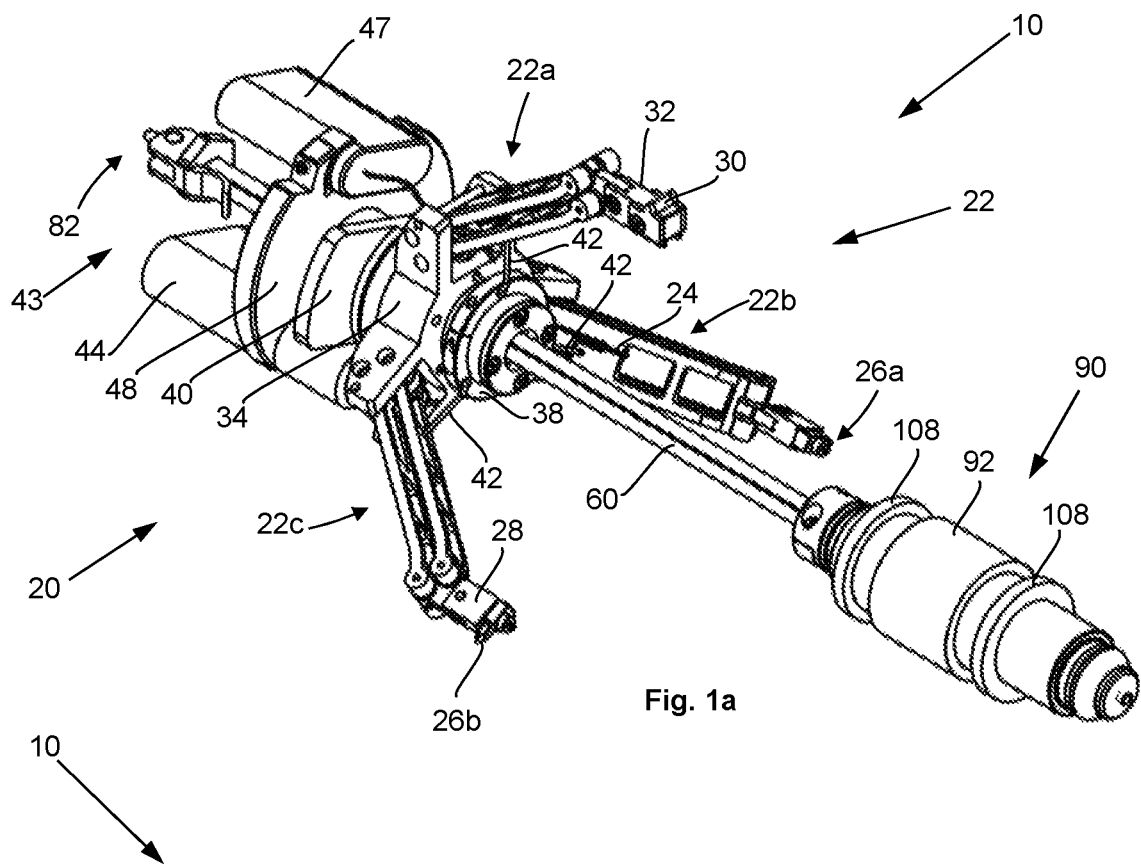
FIG. 1a shows a front-perspective view of a rotatable inspection device according to an embodiment of the invention.
Figure 1B:
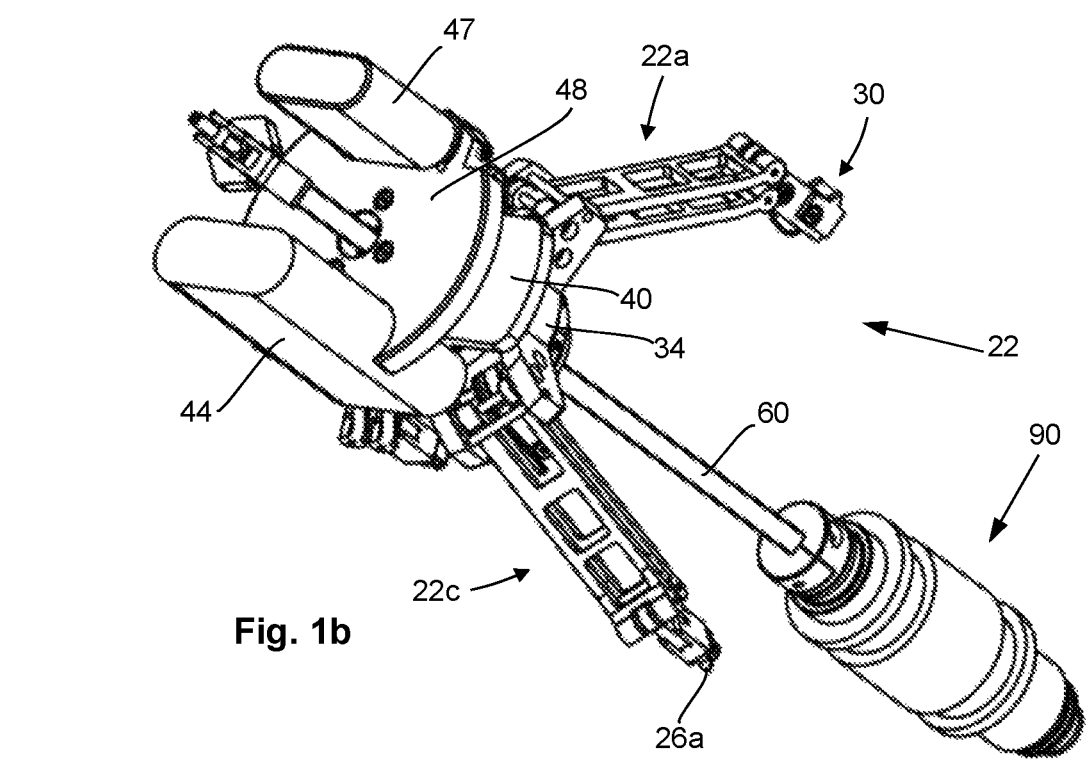
Figure 3:
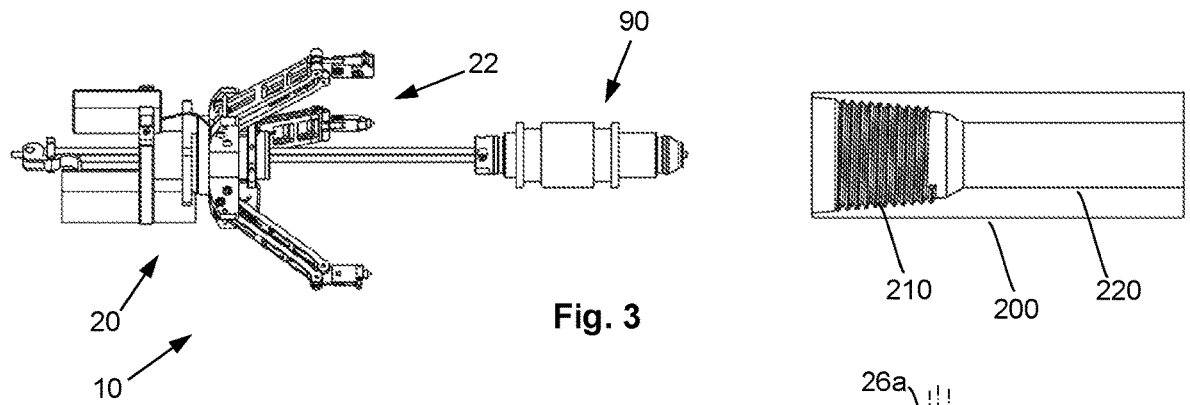
FIG. 3 shows a side view of the rotatable inspection device of FIG. 1a about to be inserted into a box portion of a drill pipe.

In an exemplary embodiment, the rotatable inspection device, as illustrated particularly in FIGS. 1a and 1b, is configured for inspecting the integrity of an axisymmetric portion in the form of a conical inner thread of a threaded portion 210 of a tube 200 as shown in FIG. 3. The axisymmetric portion within the context of the invention must therefore be interpreted as including helically symmetric portions.

Figure 9:
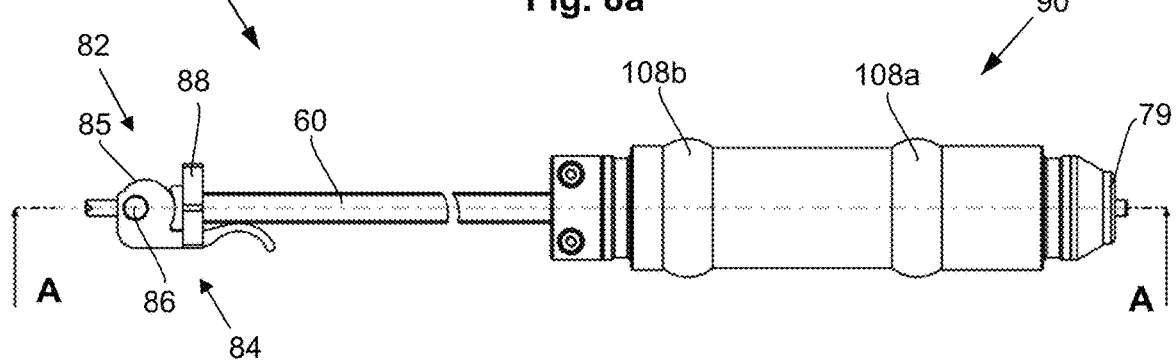
FIG. 9 shows a similar view of FIG. 8, when the tube anchoring unit is in a non-anchoring configuration.
Figure 9A:
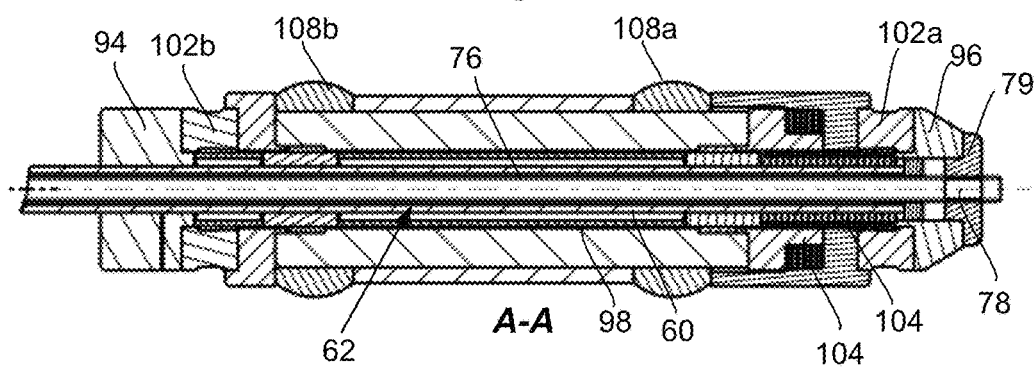
FIG. 9a shows a partial cross-sectional view of FIG. 9 along the line A-A.

The rotatable inspection device 10 may however be adapted to inspect the integrity of a helical thread of a threaded portion of a tube where the helical thread is disposed in an inner cylindrical portion (not illustrated). The tube 200 may be, in particular, a drill pipe configured to be part of a drill string. According to another exemplary embodiment of the invention, as illustrated in FIG. 9, the rotatable inspection device may be adapted to inspect the integrity of an outer thread such as the treaded portion of a bolt 250 or the pin tool joint of a drilling pipe, as described subsequently. Non-threaded portions of drilling pipes, such as stress relief grooves and welds may also be inspected by the rotatable inspection device according to the invention.

The rotatable inspection device 10 comprises a measuring unit 20 and a tube anchoring unit, as described in detail subsequently, configured to secure the measuring unit 20 to the tube 200 (FIG. 3) in order to stabilize the rotation of the measuring unit 20 about the center axis of the tube 200 during an inspection of the helical thread.

As particularly shown in FIG. 1a, the measuring unit 20 comprises an electronic device 43 and a radially movable measuring structure 22 which advantageously may be adjusted to different types of tubes having different diameters and different helical thread profiles. The radially movable measuring structure 22 is optimized to inspect a very broad range of diameters, enabling the inspection of threads with very small diameters and threads with large diameters with the same rotatable inspection device 10.

Figure 5:
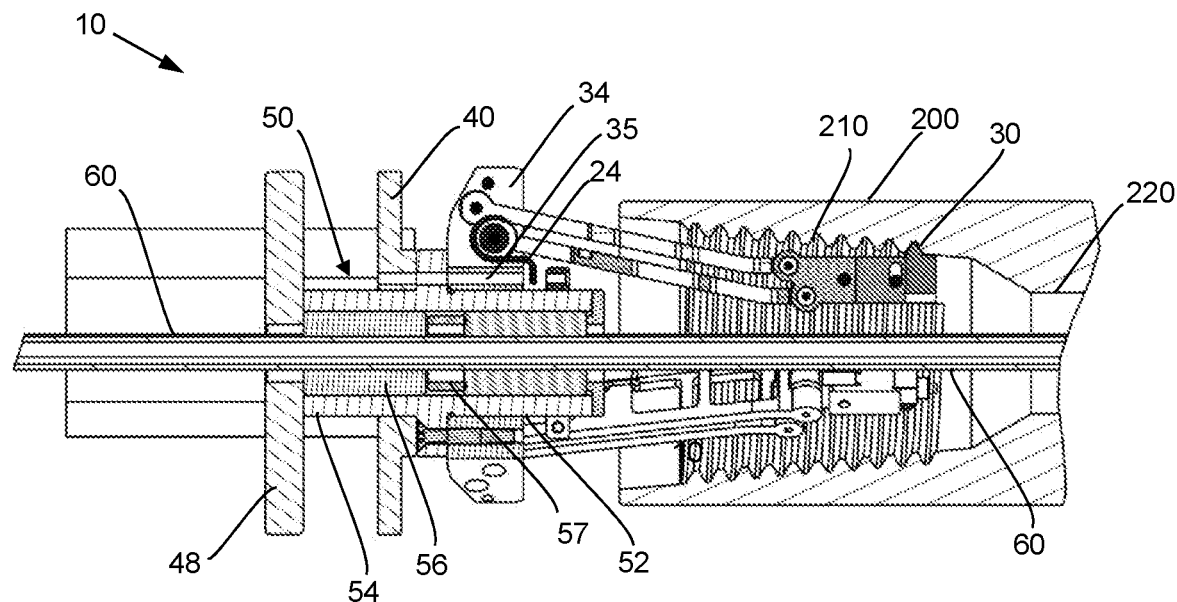
FIG. 5 shows an axial cross-sectional view of the rotatable inspection device of FIG. 1a during an inspection of a conical inner thread.

In this respect, the radially movable measuring structure 22 comprises several pivotable arms, preferably three pivotable arms 22a, 22b, 22c which are pivotally mounted at their respective proximal end on a supporting base 34. The supporting base 34 is fixedly mounted around a supporting base receiving portion 52 of a measuring unit support 50 as shown in FIGS. 5 and 7a. The supporting base may however form an integral part with the measuring unit support 50 according to a variant. The pivotable arms 22a, 22b, 22c are pivotably mounted at 120 degrees from each other with respect to the rotation axis of the measuring unit support 50 (see FIGS. 1a and 5).

A defect detection sensor 30 is mounted on a sensor support 32 which is connected to the distal end of one pivotable arm 22a. The defect detection sensor 30 may be for example a Hall-effect sensor, an Eddy current sensor, an ultrasonic sensor, or a Magnetic Flux Leakage sensor (MFL sensor). A guiding element 26a, 26b is mounted on a guiding element support 28 connected to the distal end of each of the two other pivotable arms 22b, 22c.

Figure 2:
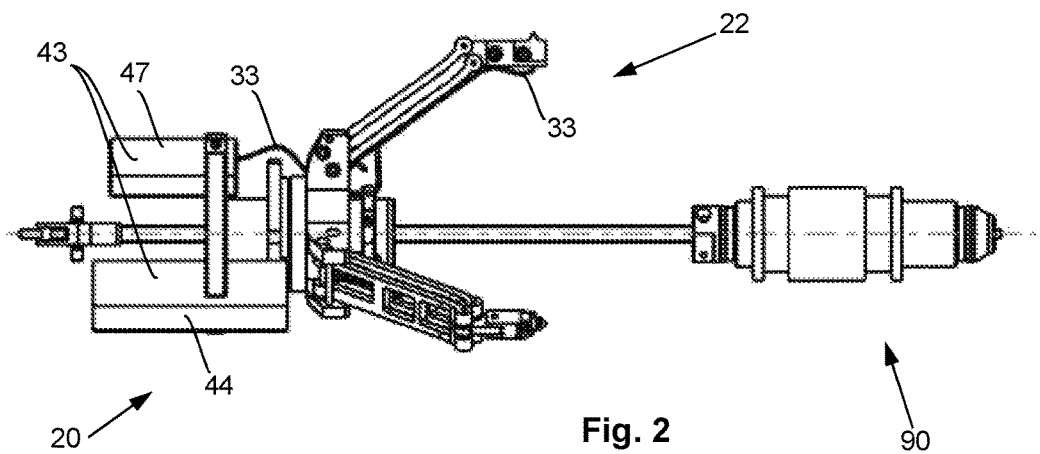

The defect detection sensor 30 is connected to the electronic device 43 through an electrical wire 33 (FIG. 2). The electronic device 43 comprises a signal processing unit 44 and a battery 47 which are both mounted on an electronic device holder 48 fixed at one end of the measuring unit support 50. The signal processing unit 44 and the battery 47 are diametrically opposed with respect to the rotation axis of the measuring unit support 50. The electronic device may however be mounted on the radially movable measuring structure 22 according to a variant.

Figure 13:
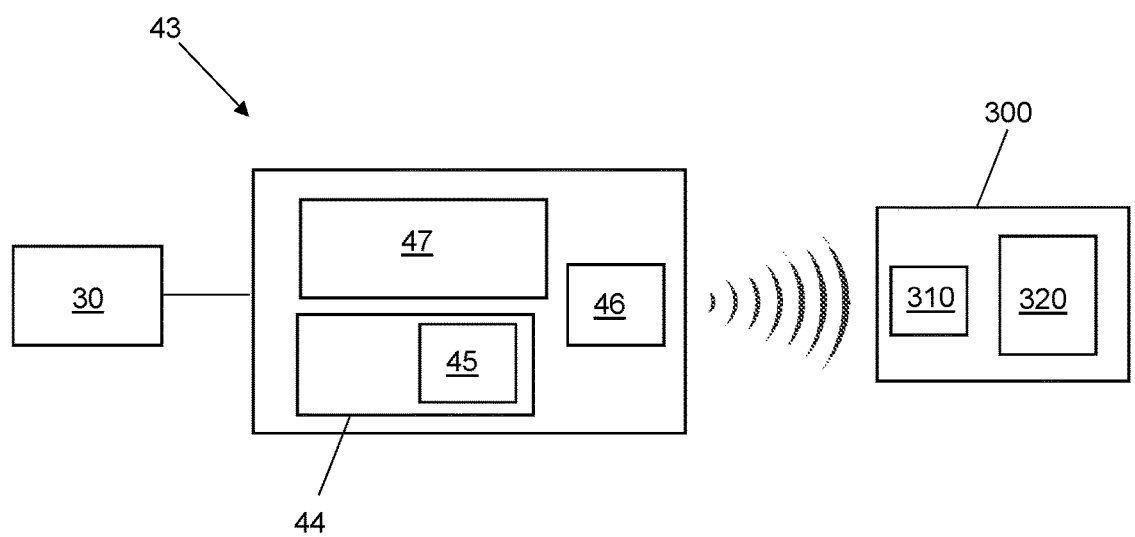
FIG. 13 shows a block diagram of the electronic device receiving a signal from the defect detection sensor of the rotatable inspection device and a remote monitoring unit in communication with the electronic device.

Referring to FIG. 13, the signal processing unit 44 of the electronic device 43 comprises an A/D converter 45 to convert the analog signal, transmitted by the defect detection sensor 30 through the electrical wire 33, into a digital signal in order to notably remove the noise generally introduced by analog signal transmissions. The electronic device 43 further comprises a transmitter 46 configured to transmit the digital signal to a remote monitoring device 300 through a wireless transmission, for example through a Bluetooth or WIFI protocol.

The remote monitoring unit 300 comprises a receiver 310 for receiving the digital signal and a display unit 320 for displaying information relative to the integrity of a threaded or non-threaded portion which is inspected. Such information may be displayed for example in real-time on the remote monitoring unit 300 when the rotatable inspection device 10 is inspecting the integrity of the helical thread.

Advantageously, the remote monitoring unit 300 may be a portable device such as an electronic tablet or a Smartphone. A dedicated software application may be downloaded on the tablet or Smartphone for displaying the integrity data of the inspected helical thread measured by the defect detection sensor 30 in a readable format. The integrity data may be stored locally or transmitted to a cloud-hosted remote database.

The pivotable arms 22a, 22b, 22c are biased to push their respective distal end outwardly to respective resting positions when the rotatable inspection device 10 is not in an operating mode. An elastic member, preferably in the form of a tension spring 24 (FIGS. 1a and 5), is connected to the supporting base 34 and to each pivotable arm 22a, 22b, 22c in order to achieve the biasing function to ensure that the defect detection sensor 30 and the guiding elements 26a, 26b are fitted and pressed against the helical thread 210 when the radially movable measuring structure 22 is placed into the tube 200 to be inspected and the pivotable arms 22a, 22b, 22c are released for an inspection of the helical thread.

The configuration of the elastic members 24 has been determined to ensure that the defect detection sensor 30 applied a sufficient radial force against the surface of the threaded portion, preferably in the order between 1 N to 5 N, in order to ensure low lift-off of the defect detection sensor 30 when the latter moves along the thread during an inspection to probe any defect of the threaded portion of the tube 200, even in the presence of grease residues, drilling fluid or other non-metallic contaminants.

Each pivotable arm 22a, 22b, 22c has an articulated parallelogram configuration whose axes of rotation have been offset to ensure that the defect detection sensor 30 and the guiding elements 26a, 26b are oriented according to the radial axis of the tube 200 irrespective of the diameter of the tube and the positions of the defect detection sensor 30 and the guiding elements 26a, 26b along the helical path of the conical threaded portion.

Figure 7:
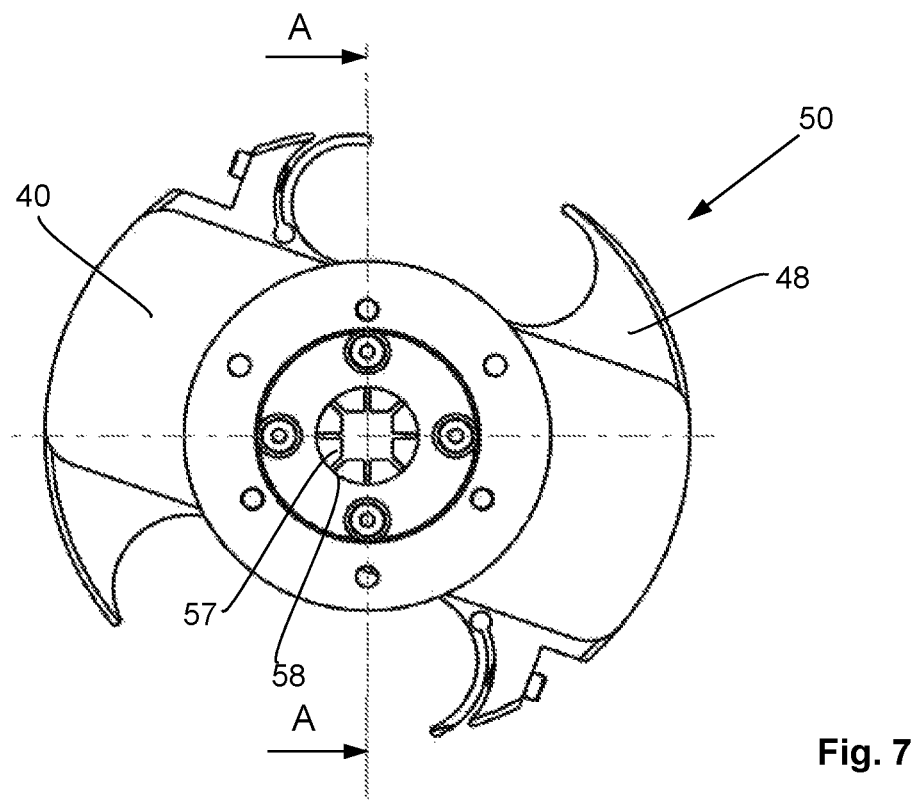
Figure 7A:
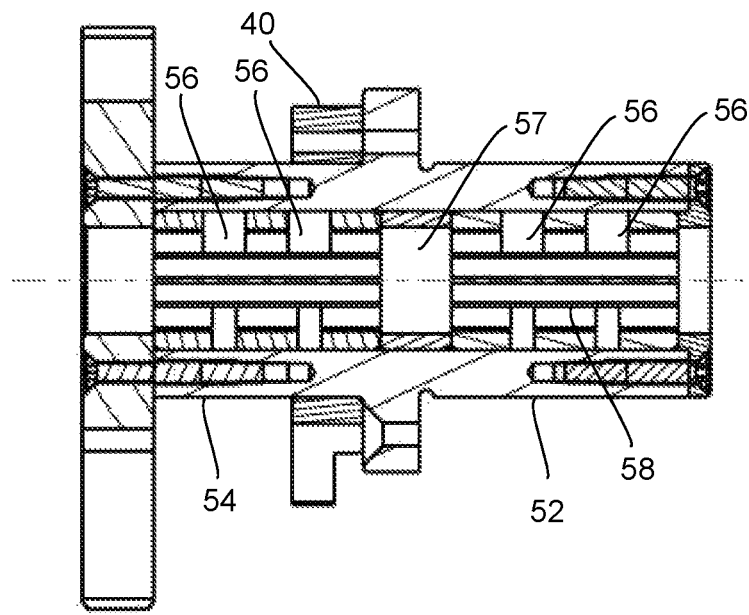
FIG. 7a shows a cross-sectional view of FIG. 7 along the line A-A.

As particularly shown in FIGS. 7 and 7a, the measuring unit support 50 comprises an axial passage 58 along which is arranged two linear bearings 56 and a bearing spacer 57 therebetween. A single linear bearing may be used if such bearing is stiff enough. Referring to FIG. 5, the rotatable inspection device 10 comprises a measuring unit driving shaft 60 fitted inside the linear bearings 56 and configured to slide along said bearing 56 when the inspection device is in an operating mode.

Accordingly, the measuring unit support 50 may be freely displaced along the measuring unit driving shaft 60 while being driven in rotation by the driving shaft 60 via the linear bearing 56. This specific driving arrangement of the measuring unit support 50 has the advantage to make the rotatable inspection device 10 adaptable to monitor different configurations of threaded portion 210 since it is the helical thread profile which imparts both the linear movements to the radially movable measuring structure 22 and the pivoting movements to the pivotable arms 22a, 22b, 22c.

The radially movable measuring structure 22 comprises a radially movable measuring structure actuator configured to bring this structure into a compact configuration. To that effect, each pivotable arm 22a, 22b, 22c is kinematically connected to a manually operable part 40 slidably mounted on an operable part sliding portion 54 of the measuring unit support 50. The kinematic connection is achieved through three cables 44. As shown in FIG. 1a, these cables 44 are connected to respective pivotable arm 22a, 22b, 22c and run through three apertures of a cable guiding ring 38 and corresponding through-holes 35 of the supporting base 34 to be anchored to the manually operable part 40.

The cable guiding ring 38 is fixedly mounted around the supporting base receiving portion 52 of the measuring unit support 50 against a portion of the supporting base 34. The three apertures of the cable guiding ring 38 and the corresponding through-holes 35 of the supporting base 34 are located at 120 degrees from each other. The cable guiding ring 38 is oriented around the supporting base receiving portion 52 to align each aperture with the corresponding through hole 35 of the supporting base 34 as particularly shown in FIG. 5.

Figure 6:
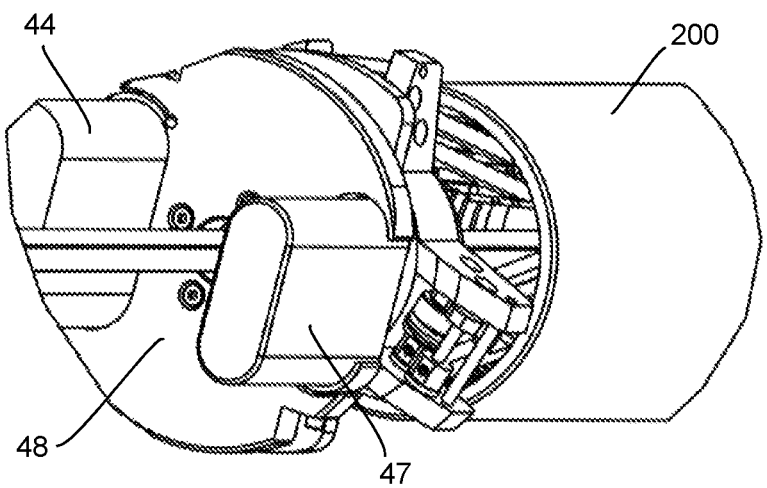
FIG. 6 shows a back-perspective view of FIG. 5.

According to the above configuration, when the operable part 40 is manually actuated in a direction opposite the supporting base 34 along the operable part sliding portion 54 of the measuring unit support 50, the cables 44 pull the three pivotable arms 22a, 22b, 22c such that their respective distal end are urged together inwardly in the direction of the rotation axis of the measuring unit support 50. This brings the radially movable measuring structure 22 into a compact configuration well-suited to be fitted inside a conical threaded portion 210 of a tube 200 to be inspected, as shown in FIGS. 5 and 6.

Once the radially movable measuring structure 22, in its compact configuration, is fitted, at least partly, into the conical threaded portion 210, the manually operable part 40 may be released which causes the pivotable arms 22a, 22b, 22c to move their respective distal end outwardly under the action of their respective elastic member 24 in order to press the defect detection sensor 30 and the first and second guiding elements 26a, 26b against the helical thread 210 to be inspected.

Figure 4:
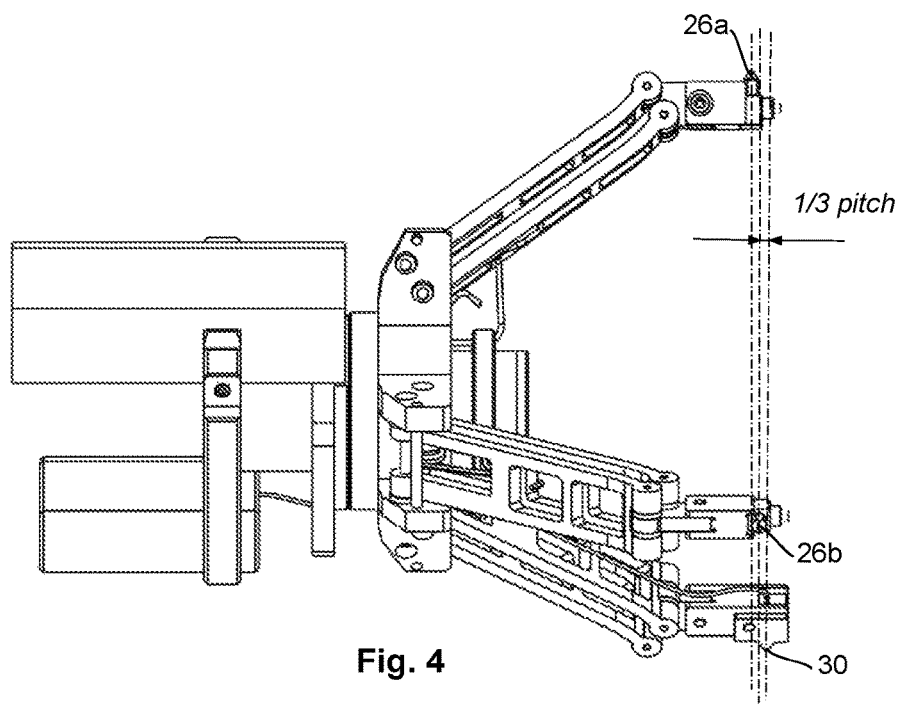
FIG. 4 shows a detailed view of the radially movable measuring structure of the rotatable inspection device.

With reference to FIG. 4, the first and second guiding elements 26a, 26b and the defect detection sensor 30 are offset from each other with respect to the rotation axis of the measuring unit support 50 by a third of a pitch of the helical thread 210 in order to compensate the 120 degrees between the pivot of each pivotable arms 22a, 22b, 22c with respect to the rotation axis of the measuring unit support 50. This offset ensures that the guiding elements 26a, 26b and the defect detection sensor 30 are precisely fitted together into respective portion of the helical thread 210.

Figure 8:
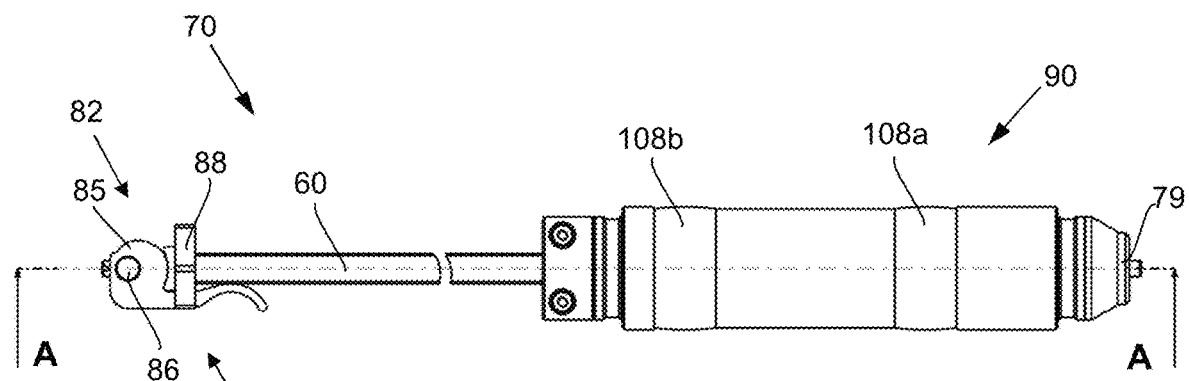
FIG. 8 shows a side view of the drive shaft and the tube anchoring unit of the rotatable inspection device of FIG. 1a, when the tube anchoring unit is in a non-anchoring configuration.
Figure 8A:
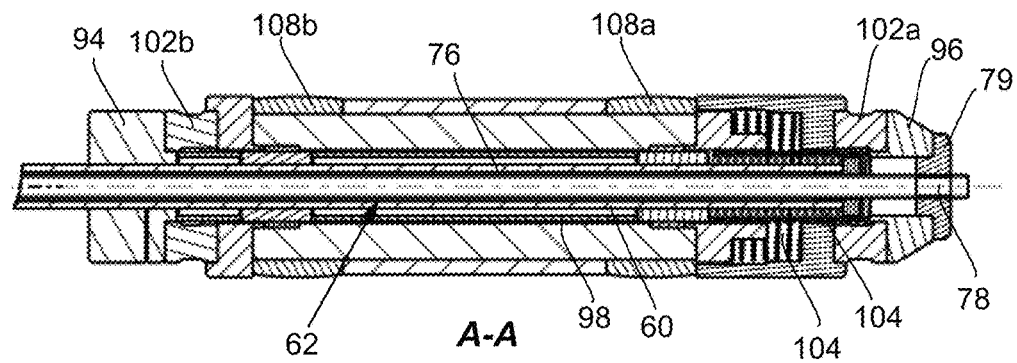
FIG. 8a shows a partial cross-sectional view of FIG. 8 along the line A-A.

As illustrated in FIG. 8, the tube anchoring unit comprises an anchoring actuator 70 and an anchoring device 90 configured to be fitted into an anchoring device receiving section 220 of the threaded tube 200 (FIGS. 3 and 5). Referring to FIGS. 8a and 8b, the anchoring device 90 comprises an axial passage 98 along which a distal portion of the measuring unit driving shaft 60 is positioned.

A tube (not shown), achieving the function of a spacer, is mounted between two radially extendable members 108a, 108b (FIGS. 8a and 8b). The respective end portion of the spacer is mounted against one side of respective extendable member 108a, 108b, while an opposite side of each extendable member 108a, 108b is mounted against a thrust bearing 102a, 102b. A flange 103 is fixedly connected to the measuring unit driving shaft 60 against one of the thrust bearing 102 located near a proximal end of the anchoring device 90.

The radially extendable members 108a, 108b may be for example in the form of polyurethane rings. The polyurethane rings 108a, 108b may expend under thrust of the spacer and respective thrust bearing 102a, 102b against two opposite sides of each polyurethane ring 108a, 108b in order to secure the anchoring device 90 against the inner cylindrical wall of the anchoring device receiving section 220 of the tube 200 as shown in FIG. 3. An elastic member 104, preferably in the form of a compressions spring is arranged concentrically to the axial passage 98 of the anchoring device 90 in order to be mounted against one side of one polyurethane ring 108a.

The anchoring actuator 70 of the anchoring unit comprises a rod 76 extending through an axial passage 62 of the measuring unit driving shaft 60 and a rod displacement actuator 82 configured to move the rod 76 into a first and a second axial position. The rod displacement actuator 82 comprises an actuatable member 79 mounted at a distal end of the rod 76 (for example screwed on a threaded portion 78 of the rod 76) and against a distal thrust bearing support 96 of the anchoring device 90. A central compression spring 105 is arranged inside the compression spring 104 and around a portion of the rod 76 to cooperate with a spring stop 80 preferably in the form of a ring fixed around the rod 76.

The rod displacement actuator 82 further comprises a lever 84 pivotally mounted about a lever pivot 86 arranged through an end portion of the rod 76 along an axis perpendicular to the longitudinal axis of the rod 76. A drive unit connectable part 88 is mounted at one end of the measuring unit driving shaft 60. The lever 84 comprises a cam portion 85 configured to cooperate with the drive unit connectable part 88 in order to displace the rod 76 along a direction away from the actuatable member 79 of the rod displacement actuator 82 from the first to the second axial position.

The displacement of the rod 76 from the first to the second axial position causes, on the one hand, the compression of the central compression spring 105 under the action of the spring stop 80 and, on the other hand, the compression of both polyurethane rings 108 simultaneously through the action of the actuatable member 79 against the distal thrust bearing support 96 which presses against one thrust bearing 102a and through the counteraction of the flange 103, the other thrust bearing 102b and the spacer 92. In this configuration, the anchoring device 90 is securely fitted inside the anchoring receiving section 210 of the tube 200 to be inspected.

When the lever 84 is returned to its initial position, the rod 76 is displaced in the opposite direction from the second axial position to the first axial position under the action of the central spring 105 on the spring stop 80 connected to the rod 76. The anchoring device 90 is no longer under load and both polyurethane rings 108a, 108b return simultaneously to their non-extended configuration under the action of the compression spring 104 acting on one polyurethane ring 108a. In this configuration, the anchoring device 90 is no longer securely fitted inside the anchoring receiving section 210 of the tube 200 and the threaded tube inspection device 10 may be removed.

Figure 10:
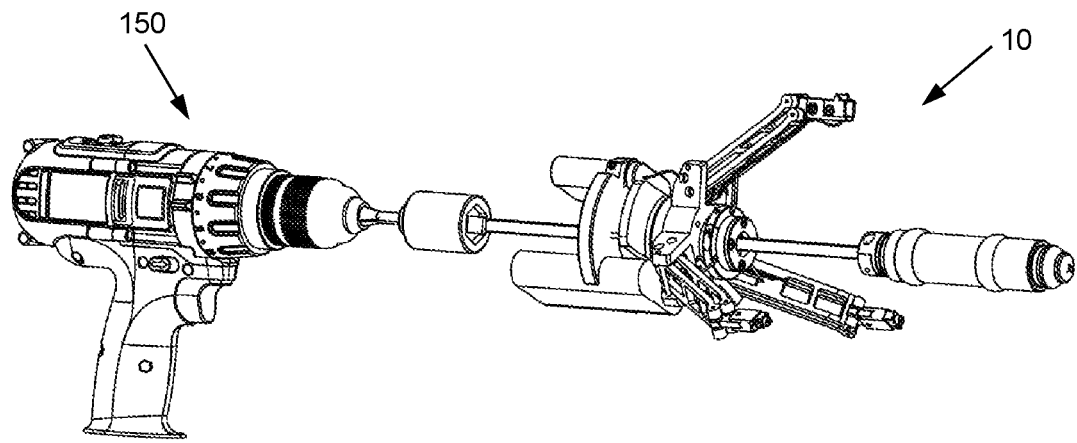
FIG. 10 shows a perspective view of the rotatable inspection device comprising a drive unit.

As illustrated in FIG. 10, the rotatable inspection device 10 comprises a drive unit 150. The drive unit 150 is connected to the drive unit connectable part 88 of the measuring unit driving shaft 60 as shown in FIG. 8. The torque applied by the drive unit 150 to the drive unit connectable part 88 is transmitted to the measuring unit support 50 through the linear-motion bearing 56, bringing the rotatable inspection device 10 in rotation. The drive unit connectable part 88 may have for example a hexagonal shape, allowing the torque of the drive unit to be transmitted using standard hexagon socket wrench.

One of the advantages of the rotatable inspection device as described above lies on its ease of use for detecting possible defects during an inspection of a threaded portion 210 of a tube 200. During the inspection, the operator executes the following operations:
 pulling the manually operable part 40 backwards along the sliding portion 54 of the measuring unit support 50 to bring the radially movable measuring structure 22 in a compact configuration,
 positioning the anchoring device into the receiving section of the tube and fitting, at least partly, the radially movable measuring structure into the threaded portion of the tube to be inspected,
 pulling the lever 84 to secure the anchoring device 90 into the receiving section 220 of the tube 200,
 releasing the manually operable part 40 to move the respective distal end of the pivotable arms 22a, 22b, 22c outwardly under the action of their respective flexion spring 24 in order to press the defect detection sensor 30 and the guiding elements 26a, 26b against respective portion of helical thread 210,
 rotating the measuring unit driving shaft 60 by means of the drive unit 150 in order to move the defect detection sensor 30 and the guiding elements 26a, 26b along the helical thread, and
 reading the information displayed on the display unit 320 of the handheld remote monitoring unit 300.

In the event, the rotatable inspection device 10 is used for inspection of the integrity of non-threaded axisymmetric portions, the translation of the rotatable inspection device may be manually imparted by the operator or achieved by other means such as a lead screw mechanism. In an embodiment, the lead screw rotates with the measuring unit driving shaft 60 and the lead screw nut is secured a non-rotating part, such as the drive unit 150 or the radially extendable members 108 of the anchoring device in order to generate an axial motion from the rotation of the measuring unit driving shaft 60.

Figure 11:
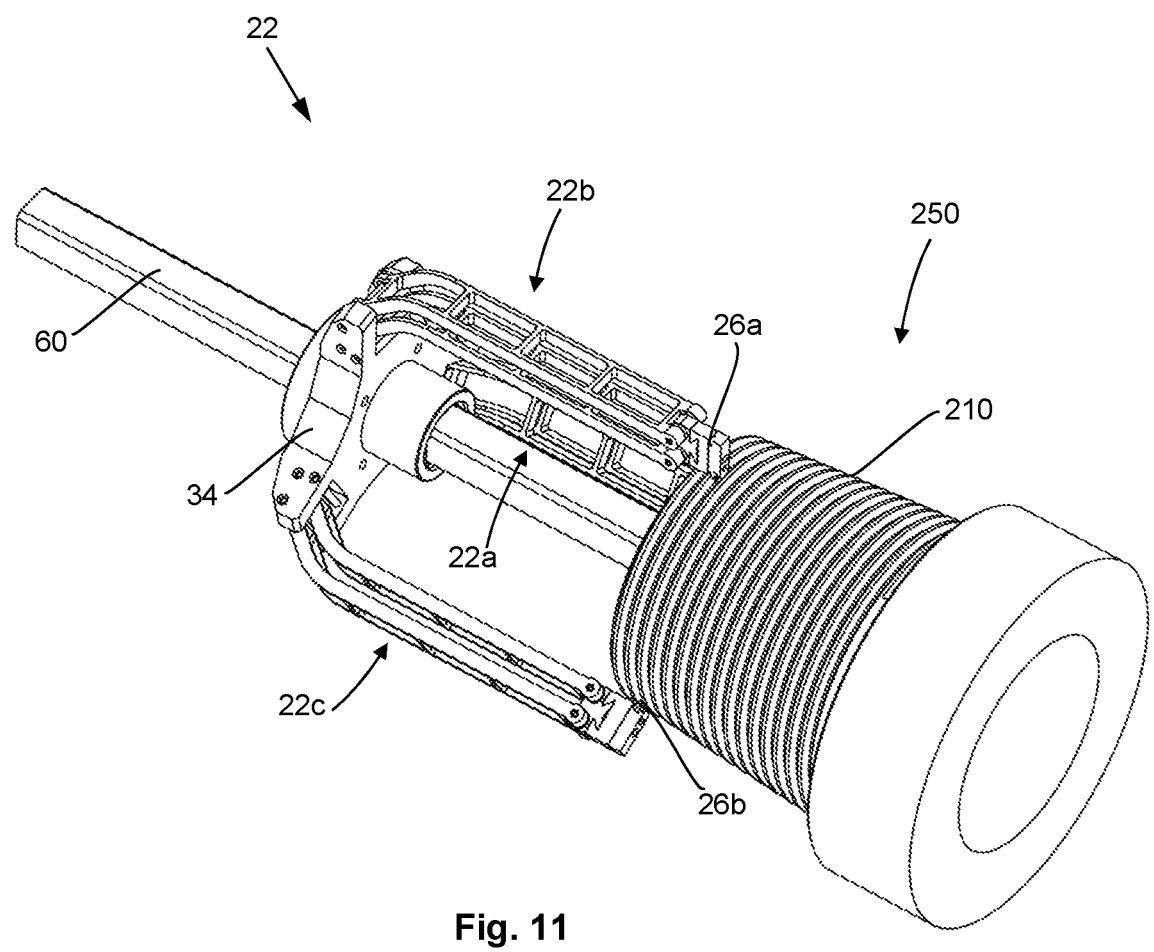
FIG. 11 shows a perspective view of the radially movable measuring structure of the rotatable inspection device according to another embodiment.

FIG. 11 shows another exemplary embodiment of a radially movable measuring structure of the rotatable inspection device suitable for inspection of the integrity of the helical thread 210 of a bolt 250. In that respect, the radially movable measuring structure 22 comprises three pivotable arms 22a, 22b, 22c pivotally mounted on a supporting base 34 at 120 degrees from each other with respect to the rotation axis of the radially movable measuring structure 22.

Each pivotable arm 22a, 22b, 22c is spring-loaded to push the distal ends of the three pivotable arms inwardly against respective regions of the helical thread 210 of the bolt 250. As for the exemplary embodiment described above, a defect detection sensor (hidden by the threaded portion of the bolt) is mounted at the distal end of one pivotable arm, while a first and a second guiding element 26a, 26b are mounted at the distal end of the respective arm of the two other pivotable arms 22b, 22c.

According to this embodiment, the three pivotable arms 22a, 22b, 22c, may be pivotally actuated by a manually operable part similar to the one previously described in order to move together the respective distal end of the pivotable arms outwardly in a direction opposite the direction towards the rotation axis of the radially movable measuring structure 22.

Figure 12A:
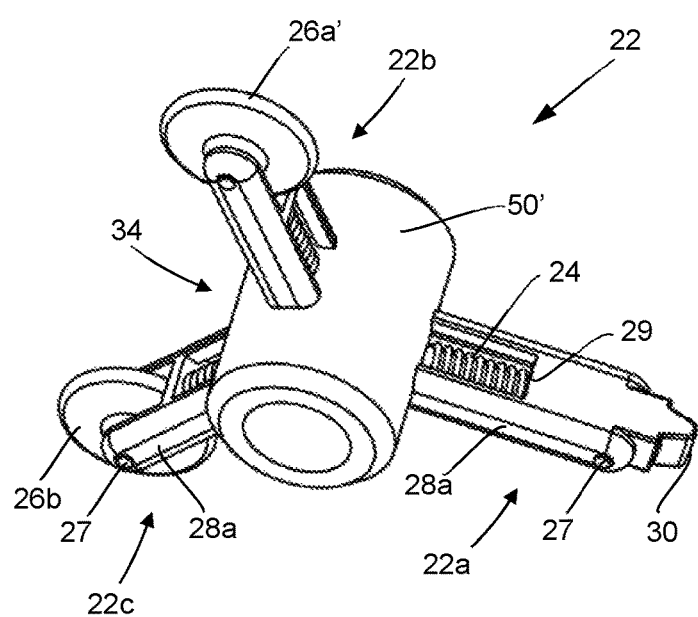
FIG. 12a shows a perspective view of the radially movable measuring structure of the rotatable inspection device according to a further embodiment.
Figure 12B:
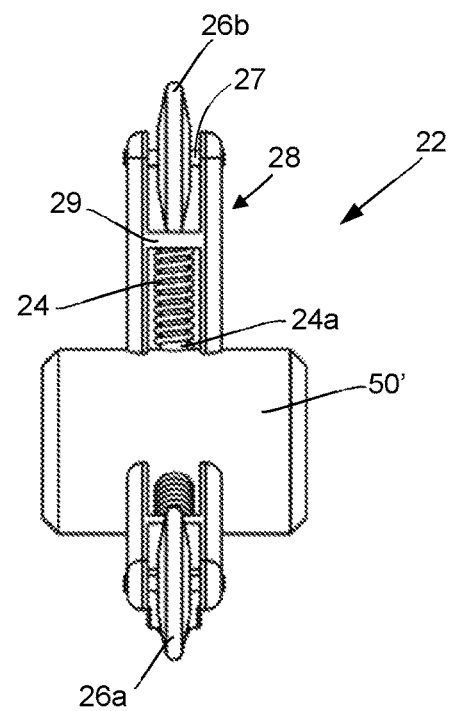

FIGS. 12a, 12b illustrate another embodiment of the radially movable measuring structure 22 which is particularly adapted to inspect internal thread of tubes of large diameters, in particular to those having conical threaded portion opening.

The radially movable measuring structure 22 comprises a measuring unit support 50' which is configured to rotate about the central axis of a threaded cylindrical part. Three linearly extendable arms 22a, 22b, 22c are mounted at 120° from each other and extend from the measuring unit support 50' along an axis perpendicular to the axis of rotation of the measuring unit support 50'. Each extendable arm 22a, 22b, 22c comprises a guide 28 which comprises on two opposite sides a linear slit 28a. A defect detection sensor 30 is mounted at a distal end of one extendable arm 22a, while a first and a second guiding element 26a, 26a, for example in the form of rotatable discs, are each mounted at a distal end of one of the two other extendable arms 22b, 22c.

The defect detection sensor 30 is connected or forms an integral part with a rectangular portion comprising on two opposite sides a projection 27 fitted into the corresponding linear slit 28a of the guide 28 such that the sensor 30 may slide along the guide 28 of the extendable arm 22a. Each rotatable disc 26a, 26b is mounted to rotate about a shaft 27 whose both extremities protrude into respective linear slit 28a of the guide 28 of respective extendable arm 22b, 22c such that each rotatable disc 26a, 26b may slide along their respective guide 28 of their respective extendable arm 22b, 22c. A compression spring 24 is mounted inside the guide 28 of each extendable arm 22a, 22b, 22c and cooperate with a stop spring 29 to urge the rotatable discs 26a, 26b and the defect detection sensor 30 outwardly along a radial direction.

The first and second rotatable discs 26a, 26b and the defect detection sensor 30 are offset from each other with respect to an axis perpendicular to the rotation axis of the measuring unit support 50' by a third of a pitch of the helical thread. This offset compensates the 120 degrees between each extendable arm to ensure that the rotatable discs 26a, 26b and the defect detection sensor 30 are precisely fitted together into different portions of the helical thread 210.

During an inspection operation of the integrity of a conical threaded portion, the compression spring 24 of each guide 28 urges the defect detection sensor 30 and the rotatable discs 26a, 26b against the helical thread. The sensor 30 and the discs 26a, 26b are configured to slide radially inwardly, under the action of the surface of the threaded portion, as they move along the helical thread of the conical threaded portion. The radially movable measuring structure 20 according to this embodiment may be secured to the tube to be inspected by an anchoring device as the one described above.

The rotatable inspection device according to the invention may further comprise additional sensors, in particular an angular position sensor and a linear position sensor in order to localize a defect on a threaded or non-threaded portion of a tube according to the angular and axial positions of the measuring unit driving shat 60 of the measuring unit 20.

In order to ensure full traceability of the inspection data, it is desirable to record the position of the defect detection sensor 30 relative to the part being inspected alongside with the defect detection sensor data. For thread inspection, as the defect detection sensor 30 follows a helical path, a single position measurement is necessary to determine its position on the part. Provided the sensor has been correctly positioned at the start of the thread, a measurement of its angular position is sufficient to reconstitute a defect map of the thread. Alternatively, a linear position measurement of measuring unit support 50 on the measuring unit driving shaft 60 can be used to achieve the same function.

In its simplest embodiment, the angular sensor is a Hall sensor or optical gate giving one electrical impulse per rotation of the measuring unit support 50, e.g. with a magnet or light source on a fixed portion of the rotatable inspection device 10 and a Hall device or light detector of a rotating portion. In an advantageous embodiment, the angular position is determined with respect to gravity (as the part is stationary during inspection) by using a 2D or 3D accelerometer placed on a rotating part of the rotatable inspection device 10. An optional gyroscope placed on a rotating part of the rotatable inspection device 10 may be used to enhance the precision of the angle measurement during inspection, using data fusion algorithms known from the art.

Although the radially moveable measuring structure 22 of any of the above described embodiments relies on three arms 22a, 22b, 22c, the function of these arms may be achieved through other means. For example, the radially movable measuring structure 22 could be shaped such as to allow only one or more radial extensions in regions to which the defect detection sensor 30 and/or guiding elements 26 are fixed. The radially moveable measuring structure 22 may be in the form of a single part which may combine the functions of the base receiving portion 52, the arms 22, elastic members 24 and potentially guiding element supports 28.

In addition, the radially movable measuring structure 22, the electronic device 43 and the measuring unit support 50 may form an integral part to obtain a single part measuring unit 20 which may be produced for example through an additive manufacturing process. Such a single part measuring unit 20 may achieve the functions of the radially movable structure 22, the functions of the flexion/compression springs 24, the functions of sensor support 32, the function of supporting base 34, as well as all the functions of the measuring unit support 50. This single flexible part may achieve all the sub-functions of the measuring unit support, namely the functions of the supporting base receiving portion 52, the function of operable part sliding portion 54 and linear bearings 56.

Various modifications and variations to the described embodiments of the invention will be apparent to those skilled in the art without departing from the scope of the invention as defined in the appended claims. For example, the guiding elements may be replaced by additional defect detection sensors, each sensor inspecting different portions of the helical thread.

REFERENCE LIST

Rotatable Inspection device 10
  Measuring unit 20
    Radially movable measuring structure 22
      Biased arms 22a, 22b, 22c
        Pivotable arms (one embodiment)
        Extendable arms (one embodiment)
        Biasing means
        Elastic members
        Flexion springs 24 (one embodiment)
        Compression spring 24 (one embodiment)
        Guiding element 26a, 26b
        Guiding element supports 28
      Defect detection sensor 30
        Electromagnetic sensor
        Hall-effect sensor
        Ultrasound sensor
      Sensor support 32
      Electrical wire 33
      supporting base 34
        Through-holes 35
    Radially movable measuring structure actuator
      Cable guiding ring 38
      Manually operable part 40
      Cables 42
    Electronic device 43
      Signal processing unit 44
        A/D converter 45
      Transmitter 46
      Battery 47
      Electronic device holder 48
    Measuring unit support 50

Supporting base receiving portion 52
Operable part sliding portion 54
Linear bearings 56
Bearing spacer 57
Axial passage 58
Measuring unit driving shaft 60
Square cross-section
Axial passage 62
Anchoring unit
Anchoring actuator 70
Rod 76
Threaded portion 78
Actuator member 79
Spring stop 80
Rod displacement actuator 82
Lever 84
Cam portion 85
Lever pivot 86
Drive unit connectable part 88
Anchoring device 90
housing 92
Cylindrical spacer
Proximal thrust bearing support 94
Second end portion 96
Axial passage 98
Bearing members 100
Thrust bearings 102a, 102b
Ball-bearings
Flange 103
Elastic members 104
Compression springs
Central compression spring 105
Radially extendable members 108
Drive unit 150
Threaded and non-threaded part 200
Tube
Threaded portion 210
Conical threaded portion
Anchoring device receiving section 220
Bolt 250
Remote monitoring unit 300
Receiver 310
Display unit 320

The invention claimed is:

1. Rotatable inspection device for inspection of the integrity of an axisymmetric portion of parts, said inspection device including a measuring unit configured to be rotated about the symmetry axis of the axisymmetric portion, the measuring unit comprising:
a radially movable measuring structure comprising a defect detection sensor,
an electronic device for processing and transmitting the signal measured by the defect detection sensor along said portion, and
a measuring unit support supporting the radially movable measuring structure,
wherein the electronic device is configured to wirelessly transmit the processed signal to a remote monitoring unit and wherein said axisymmetric measuring structure is configured to urge the defect detection sensor to be in contact against said portion to be inspected.

2. The rotatable inspection device of claim 1, wherein the radially movable structure comprises at least one biased arm, the defect detection sensor being mounted at a distal end of said at least one biased arm.

3. The rotatable inspection device of claim 2, wherein said axisymmetric portion is a threaded or non-threaded portion of a tube, said at least one biased arm being configured to urge the defect detection sensor against the threaded portion or non-threaded portion to be inspected.

4. The rotatable inspection device of claim 1, wherein the electronic device comprises a battery, a transmitter and a signal processing unit including an A/D converter for converting the analog signal measured by the defect detection sensor into a digital signal to be sent to the remote monitoring unit.

5. The rotatable inspection device of claim 1, wherein the radially movable measuring structure comprises a first, a second and a third biased arm, and wherein the defect detection sensor is mounted at a distal end of the first biased arm while a first and a second guiding elements are mounted at a distal end of the second and third biased arms respectively.

6. The rotatable inspection device of claim 5, wherein a proximal end of each of said first, second and third biased arms is pivotally mounted on a supporting base which is connected or forms an integral part with the measuring unit support.

7. The rotatable inspection device of claim 6, wherein each of said first, second and third biased arms is biased by an elastic member.

8. The rotatable inspection device of claim 7, configured to inspect the integrity of a helical thread of a threaded portion located on an inner surface of a threaded tube, the elastic member being arranged to urge the distal ends of said first, second and third biased arms outwardly against said threaded portion.

9. The rotatable inspection device of claim 7, configured to inspect the integrity of a helical thread of a threaded portion located on an outer surface of a threaded tube, the elastic member being arranged to urge the distal ends of said first, second and third biased arms inwardly against said threaded portion.

10. The rotatable inspection device of claim 5, wherein each of said first, second and third biased arms is kinematically linked to a manually operable part, wherein the manually operable part is slidably mounted on a manually operable sliding portion of the measuring unit support.

11. The rotatable inspection device of claim 10, wherein said first, second and third biased arms are pivotally actuated by the sliding movement of the manually operable part along said sliding portion to move together their respective distal end inwardly in a direction towards the rotation axis of the measuring unit support or outwardly in a direction opposite the direction towards said rotation axis.

12. The rotatable inspection device of claim 5, wherein the sensor(s) and guiding element(s) are offset from each other with respect to the rotation axis of the measuring unit support by P/N, where P is the pitch of a helical thread of a threaded portion to be inspected and N the total number of guiding elements and sensing elements.

13. The rotatable inspection device of claim 1, wherein said first, second and third biased arms are arranged at 120 degrees from each other with respect to the rotation axis of the measuring unit support.

14. The rotatable inspection device of claim 1, further comprising a measuring unit driving shaft to rotate the measuring unit about the axis of rotation of the rotatable inspection device, wherein the measuring unit support comprises an axial passage receiving a linear-motion bearing through which the measuring unit driving shaft passes.

15. The rotatable inspection device of claim 14, further comprising a drive unit connected to the measuring unit driving shaft.

16. The rotatable inspection device of claim 15, wherein the measuring unit comprises an angular sensor configured to measure the angle between said measuring unit and the drive unit.

17. The rotatable inspection device of claim 14, further comprising an anchoring unit configured to secure the measuring unit to said part to ensure rotation of the measuring unit coaxially with the axis of the axisymmetric portion during an inspection of said portion.

18. The rotatable inspection device of claim 17, wherein the anchoring unit comprises an anchoring actuator and an anchoring device configured to be fitted into a receiving section of said part, the anchoring device comprising at least one an extendable member configured to secure a static part of the anchoring device to said receiving section, and a rotatable part comprising an axial passage along which a distal portion of the measuring unit driving shaft is fixedly fitted.

19. The rotatable inspection device of claim 18, wherein the anchoring actuator comprises a rod extending through an axial passage of the measuring unit driving shaft and a rod displacement actuator configured to move the rod into a first and a second axial position, wherein the at least one extendable member is in a non-extended configuration in which the anchoring device may be fitted into the receiving section of said part when said rod is in the first axial position, and wherein the at least one extendable member is brought into an extended configuration in which the anchoring device is bound to said receiving section through said at least one extendable member when said rod is moved from the first to the second axial position.

20. The rotatable inspection device of claim 14, wherein the measuring unit comprises a linear position or displacement sensor configured to measure the position between the linear-motion bearing and the measuring unit driving shaft.

21. The rotatable inspection device of claim 1, wherein the measuring unit comprises an angular sensor configured to measure the angle between said measuring unit and said axisymmetric portion.

22. The rotatable inspection device of claim 1, wherein the measuring unit comprises an angular sensor configured to measure the angle between said measuring unit and the direction of gravity.

23. A defect inspection device comprising the rotatable inspection device of claim 1 and a remote monitoring unit configured to be in wireless communication with the electronic device of the rotatable inspection device, the remote monitoring unit comprising a display unit for displaying information relative to the integrity of said axisymmetric portion.

24. The defect inspection device of claim 23, wherein said information is displayed on the remote monitoring unit in real-time when the rotatable inspection device is inspecting said axisymmetric portion.

25. The defect inspection device of claim 23, wherein the remote monitoring unit is a portable device such as an electronic tablet or a Smartphone.

26. Method for inspection of the integrity of a helical thread located on an inner surface of a threaded tube, the method comprising the following steps:
   a) inserting, at least partly, the radially movable measuring structure of the rotatable inspection device of claim 1, into a threaded portion of said threaded tube such the defect detection sensor is fitted into a helical thread of said threaded portion,
   b) rotating a measuring unit driving shaft passing through an axial passage of the measuring unit support to move the defect detection sensor along the helical thread, and
   c) wirelessly transmitting an inspection signal to a remote monitoring unit while the defect detection sensor is moving along said helical thread.

27. The method of claim 26, wherein the radially movable measuring structure comprises three pivotable arms comprising each biasing means to urge their respective distal end outwardly, wherein the defect detection sensor is mounted at the distal end of one pivotable arm while a first and a second guiding elements are mounted at a distal end of the other two pivotable arms respectively, and wherein step a) consists of:
   pivoting the pivotable arms together to move their distal end inwardly in direction of the central axis of the threaded tube in order to fit said distal ends into the threaded portion, and
   releasing the pivotable arms to move their respective distal end outwardly under the action of their respective biasing means in order to press the defect detection sensor and the first and second guiding elements against the helical thread.

28. The method of claim 26, wherein an anchoring device is fitted into a receiving section of the threaded tube before step b).

29. The method of claim 26, wherein the angular and/or linear positions of the measuring unit are measured by an angular and/or a linear position sensor(s) during an inspection of the integrity of the helical thread, and wherein the angular and/or linear positions of the measuring unit is/are correlated to the data measured by the defect sensor data in these positions in order to create a map of the defects.

* * * * *